(12) United States Patent
Saleh

(10) Patent No.: US 10,645,475 B2
(45) Date of Patent: May 5, 2020

(54) DATA CENTER ARCHITECTURE UTILIZING OPTICAL SWITCHES

(71) Applicant: Juniper Networks, Inc., Sunnyvale, CA (US)

(72) Inventor: Adel Saleh, Santa Barbara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/588,031

(22) Filed: Sep. 30, 2019

(65) Prior Publication Data

US 2020/0029136 A1 Jan. 23, 2020

Related U.S. Application Data

(63) Continuation of application No. 15/425,154, filed on Feb. 6, 2017, now Pat. No. 10,469,922, which is a continuation of application No. 14/191,208, filed on Feb. 26, 2014, now Pat. No. 9,602,434.

(60) Provisional application No. 61/770,244, filed on Feb. 27, 2013.

(51) Int. Cl.
| | | |
|---|---|---|
| *H04B 10/00* | (2013.01) | |
| *H04Q 11/00* | (2006.01) | |
| *H04J 14/08* | (2006.01) | |
| *H04J 14/02* | (2006.01) | |
| *H04J 14/00* | (2006.01) | |

(52) U.S. Cl.
CPC ...... *H04Q 11/0005* (2013.01); *H04J 14/0212* (2013.01); *H04J 14/08* (2013.01); *H04Q 11/0066* (2013.01); *H04Q 2011/0016* (2013.01)

(58) Field of Classification Search
CPC ..... H04B 10/27; H04B 10/271; H04B 10/272
See application file for complete search history.

(56) References Cited

U.S. PATENT DOCUMENTS

| | | | |
|---|---|---|---|
| 9,008,510 B1 | 4/2015 | Zhao et al. | |
| 9,602,434 B1 | 3/2017 | Saleh | |
| 10,382,361 B1 | 8/2019 | Saleh | |
| 2012/0008945 A1* | 1/2012 | Singla | H04J 14/0204 398/49 |
| 2012/0099863 A1* | 4/2012 | Xu | H04Q 11/0005 398/49 |
| 2013/0156425 A1 | 6/2013 | Kirkpatrick et al. | |

OTHER PUBLICATIONS

"U.S. Appl. No. 14/191,208, Non Final Office Action dated Apr. 6, 2016", 10 pgs.

(Continued)

*Primary Examiner* — Daniel G Dobson
(74) *Attorney, Agent, or Firm* — Schwegman Lundberg & Woessner, P.A.

(57) ABSTRACT

Embodiments of the invention describe flexible (i.e., elastic) data center architectures capable of meeting exascale, while maintaining low latency and using reasonable sizes of electronic packet switches, through the use of optical circuit switches such as optical time, wavelength, waveband and space circuit switching technologies. This flexible architecture enables the reconfigurability of the interconnectivity of servers and storage devices within a data center to respond to the number, size, type and duration of the various applications being requested at any given point in time.

20 Claims, 6 Drawing Sheets

(56) References Cited

OTHER PUBLICATIONS

"U.S. Appl. No. 14/191,208, Notice of Allowance dated Dec. 5, 2016", 6 pgs.
"U.S. Appl. No. 14/191,208, Response filed Sep. 22, 2016 to Non Final Office Action dated Apr. 6, 2016", 8 pgs.
"U.S. Appl. No. 15/425,172, Response filed Feb. 5, 2019 to Non Final Office Action dated Oct. 5, 2018", 11 pgs.
"U.S. Appl. No. 15/425,154, Non Final Office Action dated Jan. 2, 2019", 6 pgs.
"U.S. Appl. No. 15/425,154, Notice of Allowance dated Jul. 12, 2019", 5 pgs.
"U.S. Appl. No. 15/425,154, Preliminary Amendment dated Mar. 7, 2017", 9 pgs.
"U.S. Appl. No. 15/425,154, Response filed Oct. 19, 2018 to Restriction Requirement dated Oct. 4, 2018", 8 pgs.
"U.S. Appl. No. 15/425,154, Response filed Apr. 1, 2019 to Non Final Office Action dated Jan. 2, 2019", 12 pgs.
"U.S. Appl. No. 15/425,154, Restriction Requirement dated Oct. 4, 2018".
"U.S. Appl. No. 15/425,172, Non Final Office Action dated Oct. 5, 2018", 9 pgs.
"U.S. Appl. No. 15/425,172, Notice of Allowance dated Apr. 4, 2019", 5 pgs.
"U.S. Appl. No. 15/425,172, Preliminary Amendment dated Mar. 7, 2017", 7 pgs.

* cited by examiner

DATA CENTER ARCHITECTURE UTILIZING OPTICAL SWITCHES

PRIORITY

This application is a continuation of U.S. application Ser. No. 15/425,154, filed Feb. 6, 2017, which is a continuation of U.S. application Ser. No. 14/191,208, filed Feb. 26, 2014, which claims the benefit of U.S. Provisional Application No. 61/770,244, filed Feb. 27, 2013, each of which are hereby incorporated by reference herein in their entirety.

FIELD

Embodiments of the invention generally pertain to network computing and more specifically to data center architectures utilizing optical circuit switches.

BACKGROUND

Fueled by the increasing user demand for data such as images, video, multimedia and various databases, data centers are expected to grow from today's petascale (i.e., computer systems capable of reaching performance in excess of one petaflops, i.e. one quadrillion floating point operations per second) to exascale (i.e., a thousand fold increase over petascale). Moreover, the continued emergence of new, widely diverse web services and cloud computing applications require future data centers to be more flexible/elastic. Another increasingly important requirement in future data centers is the ability to achieve very-low-latency, high-performance server-to-server connectivity, as emerging applications will likely be more complex and more computationally intensive, and thus will require much more interactions among servers compared to interactions with external clients.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe flexible (i.e., elastic) data center architectures capable of meeting exascale through the use of optical circuit switches such as optical time, wavelength, waveband and space circuit switching technologies. This flexible architecture enables the ability to reconfigure the interconnectivity of servers and storage devices within a data center to respond to the number, size, type and duration of the various applications being requested at any given point in time.

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
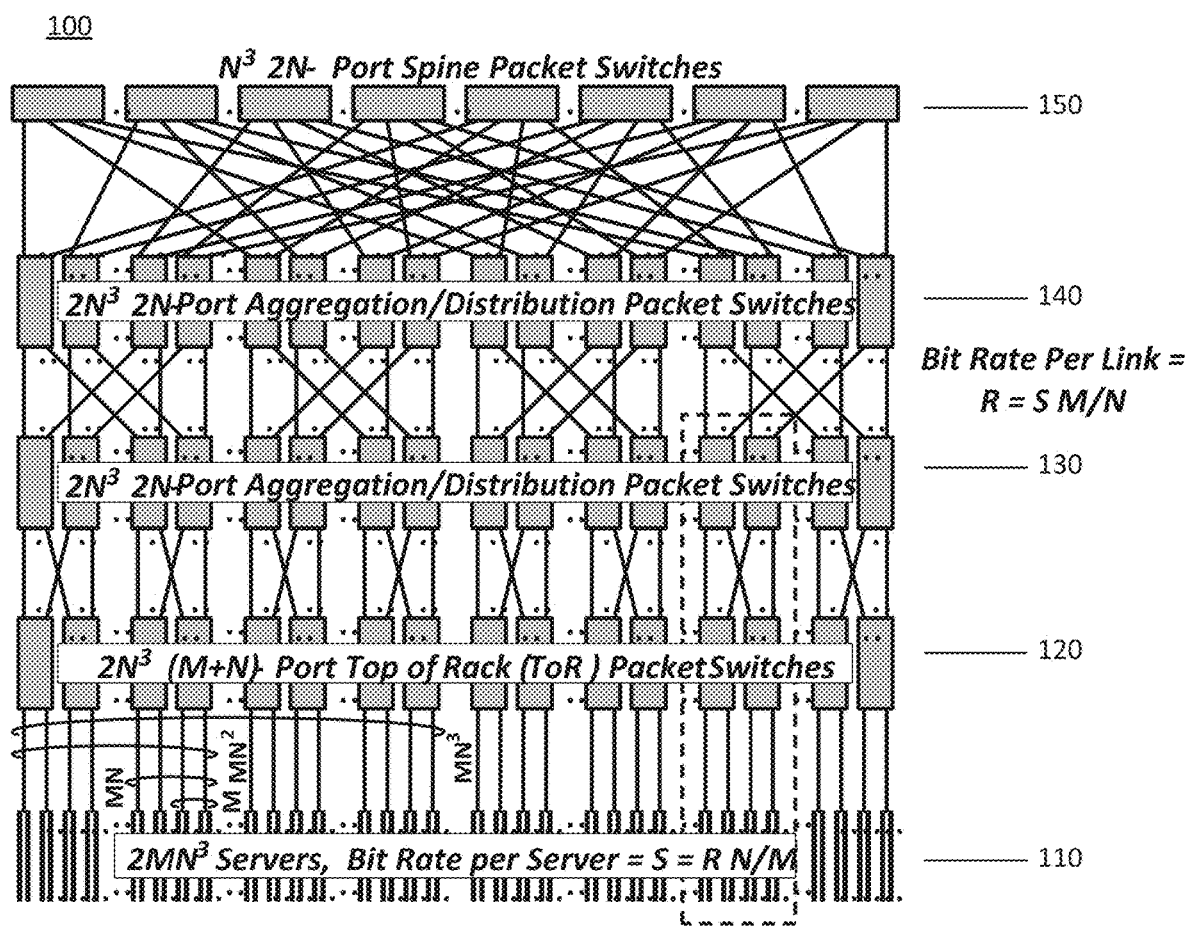
FIG. 1 is an illustration of a data center architecture utilizing multiple levels of electronic packet switches according to an embodiment of the disclosure.

FIG. 1 is an illustration of a data center architecture utilizing multiple levels of electronic packet switches according to an embodiment of the disclosure. Data center architecture 100 is based on a folded Clos interconnect topology (alternatively referred to as a "fat tree" topology) comprising level of servers 110 and multiple levels of electronic packet switches (e.g., ethernet switches). Clos network topology provides constant or non-blocking bisectional bandwidth (i.e., the bandwidth available at any level in the network) as the number of interconnected nodes (i.e., servers) increases, and also provides constant latency for expanding numbers of nodes in the cluster. Clos networks include "leaf" and "spine" levels. A leaf level is directly coupled to a set of the input/output nodes, while a spine level switches signals among the leaf stages, thereby enabling any leaf node to communicate with any other leaf node.

The illustrated data center architecture comprises four levels of packet switches including leaf switches 120 (referred to herein as top-of-rack (ToR) (or edge) switches), two levels of aggregation/distribution switches 130 and 140, and spine (or core) switches 150. The aggregation/distribution switches may provide a redundant capability in the event of switching circuit failure or unavailability, and may further used to increase the bisectional bandwidth of the data center. The spine switching layer may further serve as a gateway to external networks. Further operational details of folded clos data center architectures are discussed below in the context of embodiments of the invention described below.

Figure 2:
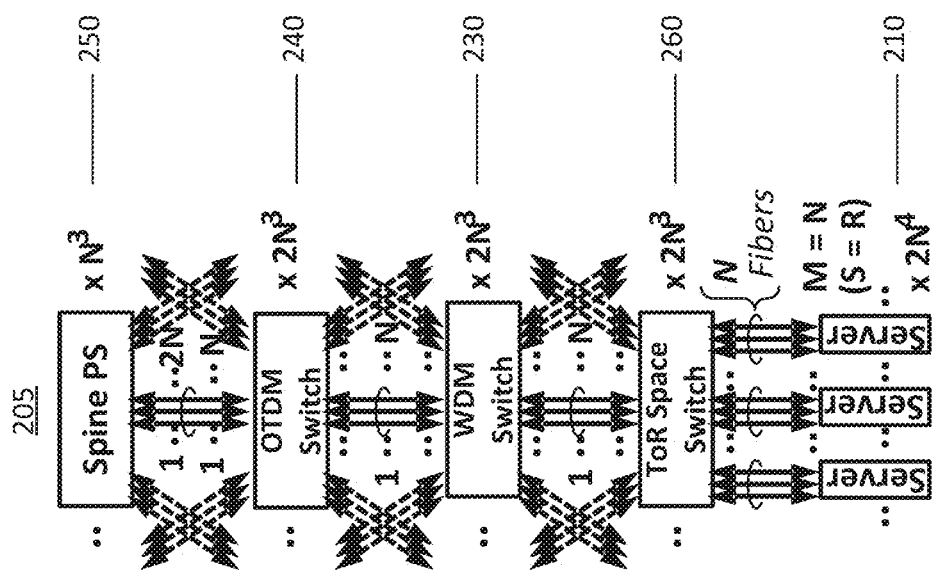
FIG. 2 includes illustrations of data center architectures utilizing optical circuit switches according to embodiments of the disclosure.
Figure 2:
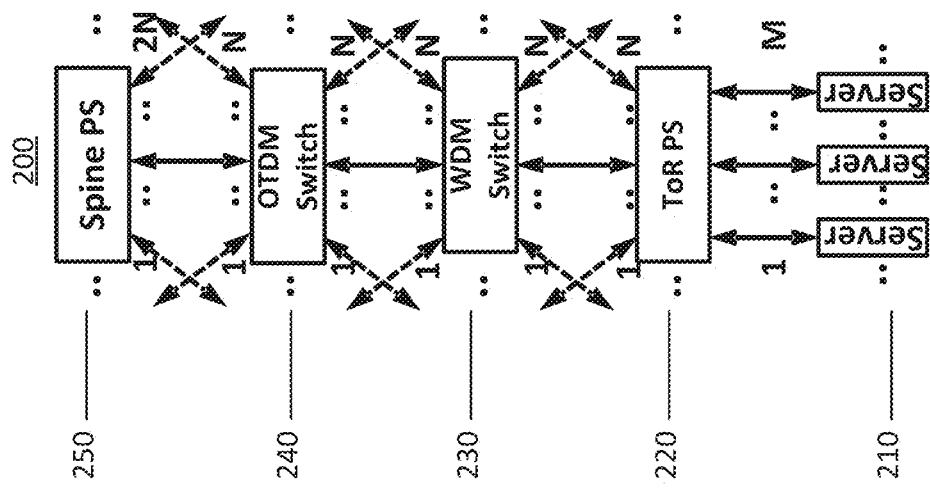

FIG. 2 includes illustrations of data center architectures utilizing optical circuit switches according to embodiments of the disclosure. Data center architecture 200 is illustrated as a folded Clos interconnect topology created using servers 210, top-of-rack electronic packet switches 220 and spine electronic packet switches 250, similar to data center architecture 100 of FIG. 1; however, instead of the electronic packet aggregation/distribution switches 130 and 140, a plurality of optical circuit switches for communicatively coupling the plurality of ToR switches to the plurality of spine switches is used. In this embodiment, wavelength division multiplexing (WDM) switches 230 and optical time-division multiplexing (OTDM) switches 240 are used.

For data center architecture 100, all levels of switching utilize electronic packet switching devices; packet switching features delivery of packets (i.e., variable-bit-rate data streams) over a shared network. When traversing the switching hardware of levels 120-150, packets are buffered and queued, resulting in variable latency and throughput depending on the traffic load in the network.

In contrast, data center architectures according to embodiments of the invention utilize optical circuit switching, which utilize dedicated connections of constant bit rate and constant delay between levels for exclusive use during the communication session. Optical circuit switching enables a higher potential bit rate and lower loss compared to electronic packet switching. Furthermore, optical circuit switches consume less power and enable the design of elastic data centers (i.e., changeable data center architectures capable of dividing the data center into different configurations) as described below.

For data center architecture 200, optical circuit switch levels 230 and 240 produce no buffering, delay or latency compared to levels 130 and 140 of data center architecture 100. In this example, there exists three electronic switch delays total—data traversing switching network 200 encounters ToR electronic packet switch level 220, spine electronic packet switch level 250, and ToR electronic packet switch level 220 again. In contrast, data center architecture 100 contains seven electronic switch delays total (levels 120-140 twice, and spine electronic packet switch level 150).

For folded clos interconnect data center architectures using purely electronic packet switching, all packet switches may have the same capacity (2N R), where N is the fan-out number per switching stage, and R is the bit rate per link—for a total of $2N^3$ racks, with M servers per rack, and a bit rate of S(=R N/M) per server. All links are bidirectional. Data storage devices may reside in the servers themselves, or may be stand-alone devices replacing some of the servers.

In data center architecture 200, WDM switches 230 and OTDM switches 240 may be deployed such that each link comprises N wavelengths, each of which comprises N time slots. Each server may reach all of the $N^3$ spine switches (via N fibers×N wavelengths×N time slots).

In a non-blocking architecture, the bisectional bandwidth is the same (=$2N^4R$) at all levels of the data center. FIG. 2 illustrates that each of ToR switches 220 (and hence, each of servers 210), can reach all of the $N^3$ spine switches (note that this implies that there are $N^3$ distinct paths between any pair of ToR switches). This results in a rich packet connectivity among servers, which is highly desirable, but does not require special routing protocol needed for the data center architecture of FIG. 1, including traffic engineering and load balancing.

Data center architecture 205 is illustrated to further include an additional optical switching layer—ToR optical space (i.e., fiber) switch level 260, such that only one electronic switch delay, from spine electronic packet switch level 250, exists. Thus, any layer of a purely electronic packet switching data center architecture may be replaced by an optical circuit switching layer. In some embodiments, at least one level of a data center architecture comprises an electronic packet switching layer so that data transferred between the servers comprises packet data. In some of these embodiments, said electronic packet switching layer comprises either the ToR layer or the spine layer.

Thus, compared to data center architecture 200, as each ToR packet switch is replaced with an optical spatial circuit switch in system 205 each of servers 210 now has N fibers×N wavelengths×N time slots; thus it can directly reach all of the $N^3$ spine switches. The number of packet-switching layers is reduced to one, thereby reducing latency. Moreover, because the bisectional bandwidth (described in further detail below) is the same for all levels of the data center, and that the spine packet switching layer is well connected to all servers (with N distinct paths between any pair of servers), both the architectures 200 and 205 are non-blocking architectures from a packet-switching point of view.

To enable optical integration, the N wavelengths used in architectures 200 and 205 may fit within a spectral region compatible with a chosen device and circuit integration technology. In some embodiments, this spectral region is limited to, for example, the C or C+L band. For N==16, for example, the wavelength separation may be 200 to 400 GHz. In some embodiment, thermoelectric coolers (TECs) are used to compensate for unavoidable thermal drifts across the data center; in other embodiments, athermal optical devices—i.e., devices having athermicity and a tunable spectral response for optical filters, are used in order to eliminate the need for TECs. Various types of wavelength-selective components such as WDM devices, asymmetric Mach-Zehnder interferometers (AMZIs) and array waveguide gratings (AWGs) are commonly implemented in PICs. Athermicity of such components implies maintaining a consistent frequency transmission spectrum as the ambient temperature changes. A tunable spectral response for these components describes changing their spectrum based on their application, as well as potentially correcting for fabrication deviations from the design.

In some embodiments of the invention, athermal operation of a filtering component on a PIC is obtained via active control by heating a region of that component. A control feedback loop maintains a set point (i.e., constant) temperature for the heated region; thus, in these embodiments there is no need to sense the ambient temperature or change the heated region's temperature as a function of the ambient temperature. By changing the set point temperature, the transmission spectrum of a filtering component may be linearly shifted to actively tune its response.

Some embodiments may also utilize optical devices with design features for improving the power efficiency of a device. In some embodiments, the above described heated region for active control is thermally isolated from the above described ambient region through modification of the thermal conduction path between the heated region and the ambient region, such as through localized thermal engineering of the substrate. In some embodiments, devices are designed to have waveguide regions having different thermo-optic coefficients (alternatively referred to herein as 'dn/dT,' as described below), either from differing materials or differing waveguide cross-sections, wherein a region where waveguides have a high dn/dT is heated, while the remaining bulk of the filtering device uses waveguides with a low dn/dT. Control at the PIC scale can be further simplified if an actively heated region is shared by two or more such devices.

Reducing N to 8 to double the wavelength separation does not produce a high enough radix to yield a large bisectional bandwidth—assuming that all the switches, electronic and optical, have the same size. The Clos topology, in general, allows different size switches for the different stages. Thus, a more optimum solution may exist for any given data center, with different size switches for the different switching technologies (electronic, and optical time, wavelength and space).

For embodiments of the invention utilizing a plurality of optical circuit switch levels, these levels may be configured in a hierarchical manner—i.e., descending levels of granularity from the server level. For example, optical space/fiber switches select from a plurality of fibers, each fiber having multiple wavebands; each of said wavebands includes a plurality of wavelengths; each of said wavelengths are capable of having a plurality of time slots. Note that said descending levels of granularity need not be consecutive—for example, data center architecture 205, which does not include a waveband optical circuit switch level between ToR space switch level 260 and WDM level 230. In other embodiments, waveband switching may be used to instead of TDM level 230.

Figure 3:
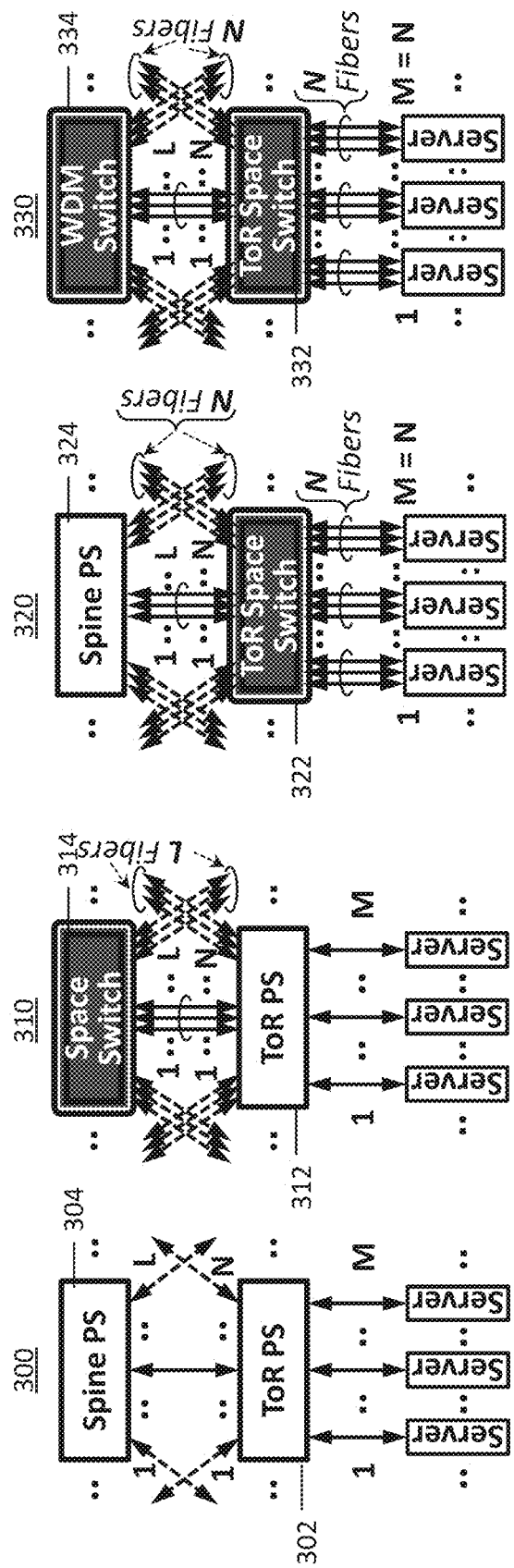
FIG. 3 illustrates two-level folded clos switching architectures according to embodiments of the disclosure.

FIG. 3 illustrates two-level folded clos switching architectures according to embodiments of the disclosure. Data center architecture 300 illustrates a two-level packet switching architecture comprised of ToR electronic packet switch level 302 and spine electronic packet switch level 304. This data center includes three electronic switch delays—from the ToR electronic packet switch level twice, and the spine electronic packet switch level once.

Data center architecture 310 includes ToR electronic packet switch level 312 and optical space/fiber switch level 314 serving as a spine level of switches; Data center architecture 320 includes optical ToR space/fiber switch level 322 and spine electronic packet switch level 324. Thus, in these embodiments, the amount of electronic switch delays are reduced; data center architecture 310 includes two electronic switch delays (ToR electronic packet switch level 312 twice) while data center architecture 320 includes one electronic switch delay (spine electronic packet switch level 324 once).

Data center architectures 310 and 320 each include at least one electronic packet switching layer; this enables the servers to exchange packet data. However, in some embodiments, electronic packet switch levels may be eliminated entirely. Data center architecture 330 includes optical ToR space/fiber switch level 332 and WDM spine switch level 334. This data center architecture includes no electronic switch delays. If needed, packet manipulations may be performed within the servers. As described above, for data center architectures including multiple optical circuit switch levels, said levels must be configured in descending levels of granularity to the server level.

Figure 4:
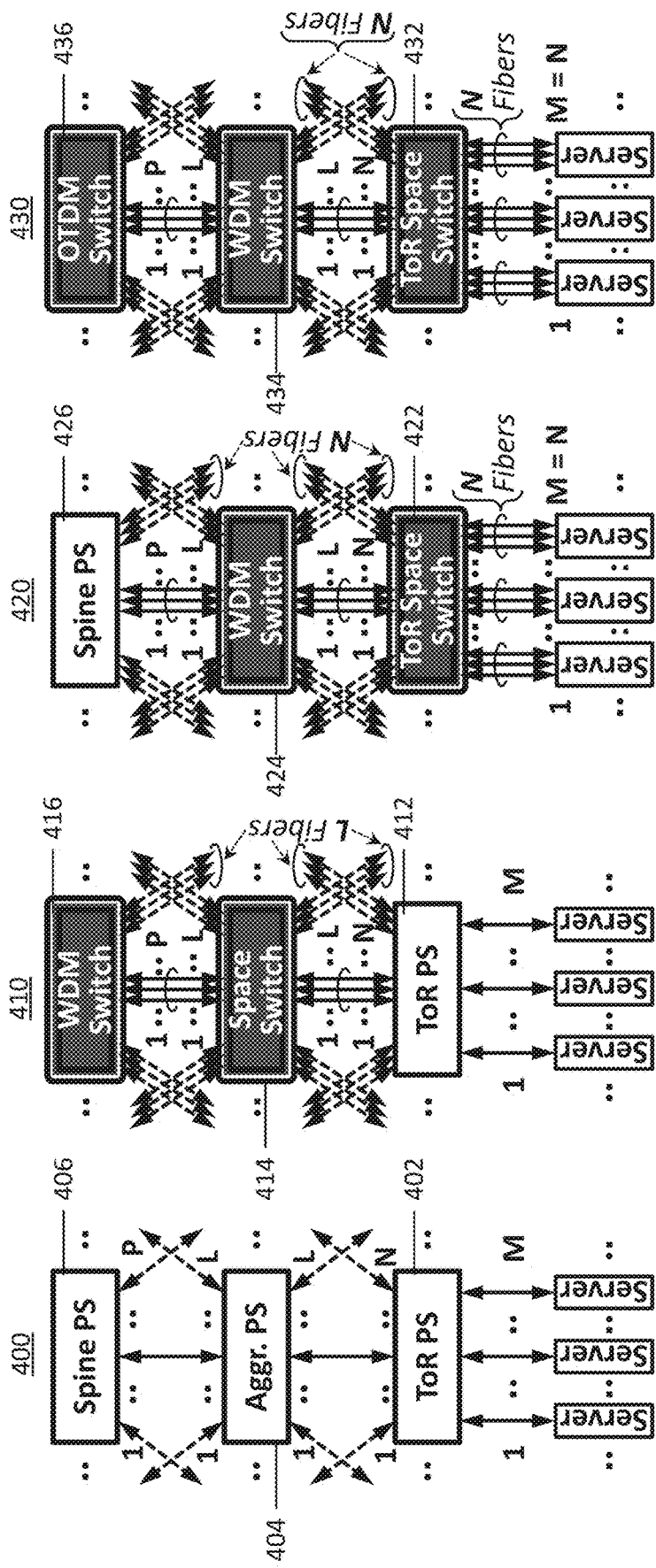
FIG. 4 illustrates three-level folded clos switching architectures according to embodiments of the disclosure.

FIG. 4 illustrates three-level folded clos switching architectures according to embodiments of the disclosure. Data center architecture 400 illustrates three-level electronic packet switching architecture comprised of ToR electronic packet switch level 402, aggregate electronic packet switch level 404 and spine electronic packet switch level 406. This data center includes five electronic switch delays—from both the ToR electronic packet switch level and the aggregate electronic packet switch level twice, and the spine electronic packet switch level once.

As described above, any of the electronic packet switch levels of data center architecture 400 may be replaced with an optical circuit switch level to reduce electronic switch delays. Embodiments not illustrated include data center architectures having a single optical switching layer. Two embodiments for data center architectures including two optical switching layers are shown. Data center architecture 410 is shown to include electronic ToR electronic packet switch level 412, optical space/fiber switch level 414 and spine WDM switch level 416. Data center architecture 420 is shown to include ToR space/fiber switch level 422, WDM switch level 424, and spine electronic packet switch level 426. In these embodiments, the amount of electronic switch delays are reduced—data center architecture 410 includes two electronic switch delays (from ToR electronic packet switch level 412 twice) while data center architecture 420 includes one electronic switch delay (from spine electronic packet switch level 424 once).

Another embodiment for a three level folded clos switching architecture including two optical switching layers—an aggregate electronic packet switching layer between a ToR optical switching layer and a spine optical switching layer, is not shown. Furthermore, data center architecture 430 includes all optical switching layers, including ToR space/fiber switch level 432, WDM switch level 434, and spine OTDM switch level 436. If needed, packet manipulations may be performed within the servers.

Similar embodiments may exist for any n-level folded clos switching architectures. For data center architectures including multiple optical circuit switch levels, said levels may comprise any type of optical circuit switch layer, but should be configured in descending levels of granularity to the server level.

Figure 5A:
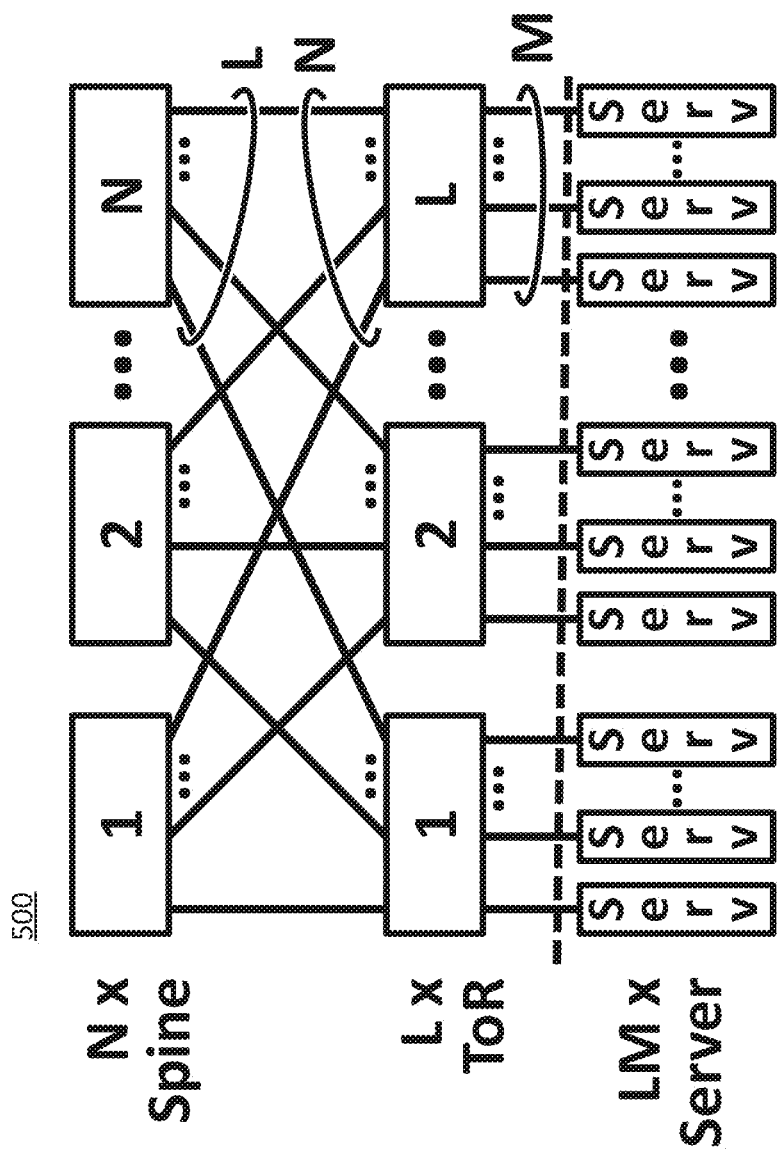
FIG. 5A and FIG. 5B illustrates configurable bandwidths for switching architectures according to embodiments of the disclosure.
Figure 5B:
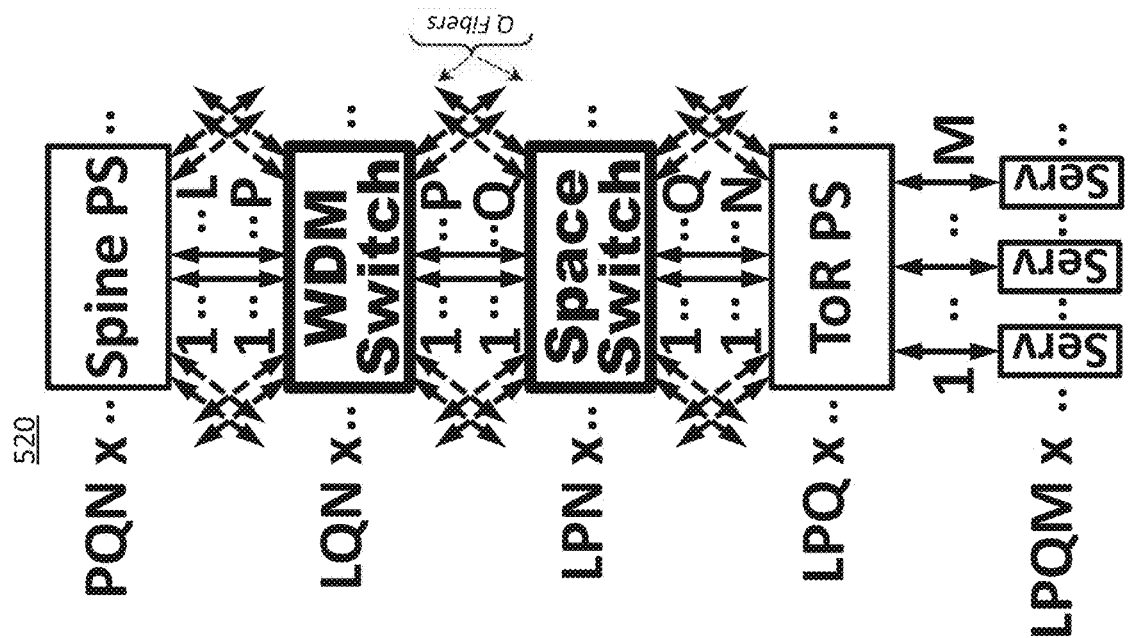
Figure 5B:
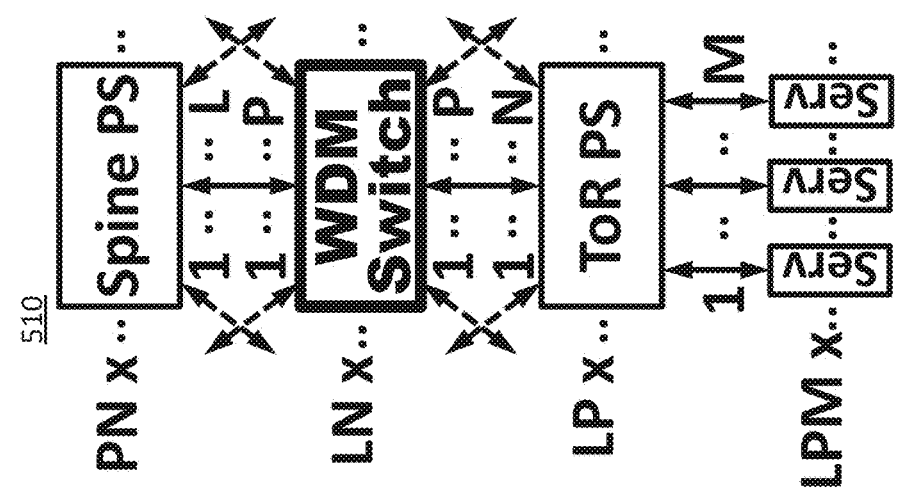
Figure 5B:
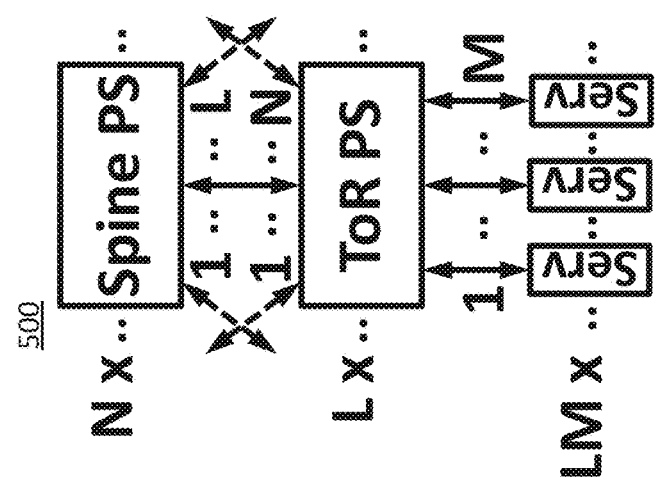

FIG. 5A and FIG. 5B illustrates configurable bandwidths for switching architectures according to embodiments of the disclosure. FIG. 5A illustrates a two-level folded clos switching architecture with general switching sizes. In this embodiment, various network components and attributes for data center architecture 500 are defined as:

Number of spine switches=N
Number of ToR switches=L
Number of Servers per ToR=M
Number of servers=M×L
Bit rate per link=R
Bit rate per server=S; bit rate per link R×spine ports N/servers per ToR M $S = R \times N / M$ Number of servers per ToR=M=R×N/S
Bisectional Bandwidth=Z=Number of servers×Bit Rate per server $Z = M \times L \times S$ or $Z = M \times L \times (R \times N / M) = L \times R \times N$ Z=Bit rate per link×number of ToR switches×number of spine switches Note that the above described bisectional bandwidth is the maximum possible for folded Clos architecture 500. Two-level data centers may be selected in order to reduce the latency inherent in 3+ level data centers for architectures that comprise only electronic packet switching layers. For these two-level data centers, increasing the bisectional bandwidth requires the use of extremely large packet switches.

FIG. 5B illustrates data center architecture 500 in addition to modified data center architecture 510, which includes one optical switching layer, and modified data center architecture 520, which includes two optical switching layers.

The bisectional bandwidth of data center architecture 510 is that of a three-level folded clos architecture (L×P×N×R), which the bisectional bandwidth of data center architecture

520 is that of a four-level folded clos architecture (L×P×Q× N×R); however, both data center architectures comprise the same latency as data center architecture 500. Thus, the bisectional bandwidth of data center architecture 500 may be increased without increasing latency or requiring larger packet switches.

Furthermore, the use of one or more optical switching layers between electronic packet switching layers allows for the configurability/re-configurability of data center implementations. For example, in data center architecture 510, the illustrated WDM switch level may be adjusted to interconnect all of the servers individually, or may be used to set up multiple decoupled partitions of servers to provide very-low-latency, high-performance server-to-server connectivity (i.e., one or more spine switches dedicated to interconnecting different subsets of the servers of the data center). Such partitioning may be useful to data centers providing more complex, i.e., more computationally intensive, applications that require much more interactions among servers than to external clients.

Embodiments thus describe a hierarchical network of switches comprising a plurality of top of rack (ToR) switches, arranged in a first level of switches, for communicatively coupling to a plurality of host devices in a network rack, and a plurality of spine switches, arranged in a second level of switches, communicatively coupled to the plurality of ToR switches to provide interconnecting communication links to the plurality of host devices. In these embodiments, the hierarchical network of switches includes at least one level of optical circuit switches. For example, the hierarchical network of switches may comprise a folded-Clos network of switches.

In some embodiments, the at least one level of optical circuit switches comprises at least one of: a plurality of optical fiber switches, a plurality of waveband switches, a plurality of wavelength switches, or a plurality of time domain switches. In some embodiments, the hierarchical network of switches consists of two levels of switches; in some of these embodiments, the two levels of switches comprises a level of optical circuit switches and a level of electronic packet switches, or two levels of switches comprises two levels of optical circuit switches.

In some embodiments, the hierarchical network of switches comprises more than two levels of switches. In some of these embodiments, each of the level of switches comprises a level of optical circuit switches; in other embodiments, the hierarchical network of switches comprises at least one level of electronic packet switches. For example, each of the plurality of ToR switches and the plurality of spine switches comprise electronic packet switches, and the at least one level of optical circuit switches comprises a level of aggregation/distribution switches to interconnect the plurality of ToR switches and the plurality of spine switches. In other embodiments, the at least one level of plurality of optical circuit switches include one or more switches for upward traffic from the plurality of ToR switches to the plurality of spine switches, and an equal amount of switches for downward traffic from the plurality of spine switches to the plurality of ToR switches. In some embodiments, the at least one level of optical circuit switches is configured to establish multiple decoupled partitions of the plurality of host devices.

In some embodiments, the plurality of time domain switches comprises at least one of one of a plurality of cyclic Optical Time Division Multiplex (OTDM) switches, or a plurality of configurable OTDM switches. In some embodiments, the plurality of wavelength switches comprises at least one of a plurality of cyclic arrayed waveguide grating router (AWGRs) coupled to tunable lasers, one or more wavelength division multiplexing (WDM) devices, or a plurality of wavelength selective switches. In some embodiments, the plurality of optical fiber switches comprises at least one of a plurality of fiber patch panels, or a plurality of micro-electrical mechanical systems (MEMS) space switches.

Embodiments describe a method comprising operations for, in a hierarchical network of electronic packet switches including a plurality of top of rack (ToR) switches, arranged in a first level of level of electronic packet switches, for communicatively coupling to a plurality of host devices in a network rack, and a plurality of spine switches, arranged in a second level of electronic packet switches, communicatively coupled to the plurality of ToR switches to provide interconnecting communication links to the plurality of host devices, increasing a bisectional bandwidth of the hierarchical network of electronic packet switches by utilizing at least one level of optical circuit switches for interconnecting the first level of electronic packet switches and the second level of electronic packet switches.

In some embodiments, the method further includes operations for establishing multiple decoupled partitions of the plurality of host devices via the at least one level of optical circuit switches. In some embodiments, the hierarchical network of electronic packet switches comprises a folded-Clos network of switches.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, levels and structures of figures may vary in size and dimensions.

The above described embodiments of the invention may comprise SI or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GalnaisN)). The carrier dispersion effects of Ill-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the invention, said heterogeneous devices utilize low loss heterogeneous optical waveguide transitions between the devices' heterogeneous and silicon-only waveguides.

Magneto-optic materials als allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3).

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. A method for routing data in a switch network, the method comprising:
   receiving, by a plurality of edge switches, data packets from a plurality of host devices, the plurality of edge switches arranged in a first switch level, the switch network further comprising a second switch level and an optical switch level arranged between the first switch level and the second switch level, the second switch level comprising a plurality of electronic switches, the optical switch level comprising one or more optical switches that are configured to change connections between the first switch level and the second switch level;
   changing connections between the first switch level and the second switch level of electronic switches using the one or more optical switches in the optical switch level; and
   receiving, by a plurality of spine switches in the second switch level of electronic switches, the data packets using the connections changed by the one or more optical switches in the optical switch level.

2. The method of claim 1, wherein the plurality of edge switches are electronic switches.

3. The method of claim 1, wherein the plurality of edge switches is a fiber-based switch space.

4. The method of claim 3, wherein the fiber-based switch space is communicatively coupled to the plurality of host devices using optical fibers.

5. The method of claim 1, wherein the optical switch level comprises first layer of optical switches and a second layer of optical switches, the first layer of optical switches being communicatively coupled to the second layer of optical switches.

6. The method of claim 5, wherein the first layer of optical switches is communicatively coupled to electronic switches in the first switch level.

7. The method of claim 6, wherein the second layer of optical switches is communicatively coupled to the second switch level of electronic switches.

8. The method of claim 5, wherein changing connections between the first switch level and the second switch level switches comprises:
   changing optical connections between the first layer of optical switches and the second layer of optical switches.

9. The method of claim 5, wherein the first layer of optical switches comprises one or more wavelength division multiplex (WDM) switches.

10. The method of claim 9, wherein the second layer of optical switches comprises one or more Optical Time Division Multiplex (OTDM) switches.

11. The method of claim 1, wherein the plurality of host devices comprise a plurality of servers.

12. The method of claim 11, wherein the plurality of servers are communicatively coupled to switches in the first switch level.

13. The method of claim 1, wherein the one or more optical switches include at least one or more of:
   a plurality of optical fiber switches;
   a plurality of waveband switches;
   a plurality of wavelength switches; or
   a plurality of time domain switches.

14. The method of claim 13, wherein the plurality of optical fiber switches comprises at least one of: a plurality of fiber patch panels, or a plurality of micro-electrical mechanical system space switches.

15. The method of claim 13, wherein the plurality of wavelength switches comprises at least one of a plurality of cyclic arrayed waveguide grating routers coupled to tunable lasers, one or more wavelength division multiplexing devices, or a plurality of wavelength switches.

16. The method of claim 1, further comprising: establishing multiple decoupled partitions of the plurality of host devices with at least one of the first switch level or the second switch level.

17. The method of claim 1, wherein at least the first switch level and the second switch level are configured as a folded-Clos network of switches.

18. A switch network comprising:
   a plurality of edge switches configured to receive data packets from a plurality of host devices, the plurality of edge switches arranged in a first switch level, the switch network further comprising a second switch level and an optical switch level arranged between the first switch level and the second switch level, the second switch level comprising a plurality of electronic switches, the optical switch level comprising one or more optical switches that are configured to change connections between the first switch level and the second switch level;
   a plurality of spine switches in the second switch level of the electronic switches, the plurality of spine switches configured to receive the data packets using the connections changed by the one or more optical switches in the optical switch level.

19. The switch network of claim 18, wherein the plurality of edge switches are electronic switches.

20. The switch network of claim 18, wherein the plurality of edge switches is a fiber-based switch space.

* * * * *